United States Patent [19]
Baumgartner et al.

[11] Patent Number: 6,108,764
[45] Date of Patent: Aug. 22, 2000

[54] NON-UNIFORM MEMORY ACCESS (NUMA) DATA PROCESSING SYSTEM WITH MULTIPLE CACHES CONCURRENTLY HOLDING DATA IN A RECENT STATE FROM WHICH DATA CAN BE SOURCED BY SHARED INTERVENTION

[75] Inventors: Yoanna Baumgartner; Anna Elman, both of Austin, Tex.

[73] Assignee: International Business Machines Corporation, Armonk, N.Y.

[21] Appl. No.: 09/213,997

[22] Filed: Dec. 17, 1998

[51] Int. Cl.[7] .................................................. G06F 15/16
[52] U.S. Cl. ........................... 712/28; 710/104; 711/119; 711/122; 711/130; 711/141
[58] Field of Search ..................... 711/119, 122, 711/130, 141; 712/28; 710/104

[56] References Cited

U.S. PATENT DOCUMENTS

| | | | |
|---|---|---|---|
| 5,673,413 | 9/1997 | Deshpande et al. ..................... | 711/141 |
| 5,878,268 | 3/1999 | Hagersten ................................ | 712/28 |
| 5,893,144 | 4/1999 | Wood et al. ............................. | 711/122 |
| 5,940,856 | 8/1999 | Arimilli et al. ......................... | 711/119 |
| 5,940,864 | 8/1999 | Arimilli et al. ......................... | 711/163 |
| 5,943,684 | 8/1999 | Arimilli et al. ......................... | 711/144 |
| 5,943,685 | 8/1999 | Arimilli et al. ......................... | 711/146 |
| 5,963,974 | 10/1999 | Arimilli et al. ......................... | 711/130 |

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A non-uniform memory access (NUMA) computer system includes first and second processing nodes that are coupled together. The first processing node includes a system memory and first and second processors that each have a respective associated cache hierarchy. The second processing node includes at least a third processor and a system memory. If the cache hierarchy of the first processor holds an unmodified copy of a cache line and receives a request for the cache line from the third processor, the cache hierarchy of the first processor sources the requested cache line to the third processor and retains a copy of the cache line in a Recent coherency state from which the cache hierarchy of the first processor can source the cache line in response to subsequent requests.

10 Claims, 4 Drawing Sheets

NON-UNIFORM MEMORY ACCESS (NUMA) DATA PROCESSING SYSTEM WITH MULTIPLE CACHES CONCURRENTLY HOLDING DATA IN A RECENT STATE FROM WHICH DATA CAN BE SOURCED BY SHARED INTERVENTION

CROSS-REFERENCE TO RELATED APPLICATIONS

This application is related to the following patent applications:

(1) Ser. No. 08/837,516, "Cache Intervention from only one of many Cache Lines sharing an unmodified value," which was filed on Apr. 14, 1997, now as U.S. Pat. No. 5,940,856, issued on Aug. 17, 1999, incorporated herein by reference;

(2) Ser. No. 09/024,307, "Apparatus and method of maintaining Cache Coherency in a multi-processor computer system with Global and Local Recently Read States," which was filed on Feb. 17, 1998, now as U.S. Pat. No. 6,018,791, issued on Jan. 25, 2000, and incorporated herein by reference; and (3) Ser. No. 09/248,503 "Non-uniform memory (NUMA) data processing system that permits multiple caches to concurrently hold data in a recent state from which data can be sourced by shared intervention," which was filed on Feb. 10, 1999, and incorporated herein by reference.

BACKGROUND OF THE INVENTION

1. Technical Field

The present invention relates in general to a method and system for data processing and, in particular, to data processing within a non-uniform memory access (NUMA) data processing system. Still more particularly, the present invention relates to a NUMA data processing system and a method in a NUMA data processing system of supplying requested data by shared intervention.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. In particular, read transactions, which are by far the most common type of transaction, may have twice the latency when targeting data resident in remote system memory as compared to read transactions targeting data resident in local system memory. Because of the relatively high latency associated with read transactions transmitted on the nodal interconnect versus read transactions on the local interconnects, it is useful and desirable to reduce the number of read transactions transmitted over the nodal interconnect and as well as to reduce the latency of such remote read transactions.

SUMMARY OF THE INVENTION

In accordance with the present invention, the number and latency of read requests in a non-uniform memory access (NUMA) computer system is reduced by supporting shared intervention. The NUMA computer system includes first and second processing nodes that are coupled together. The first processing node includes a system memory and first and second processors that each have a respective associated cache hierarchy. The second processing node includes at least a third processor and a system memory. If the cache hierarchy of the first processor holds an unmodified copy of a cache line and receives a request for the cache line from the third processor, the cache hierarchy of the first processor sources the requested cache line to the third processor and retains a copy of the cache line in a Recent coherency state from which the cache hierarchy of the first processor can source the cache line in response to subsequent requests.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
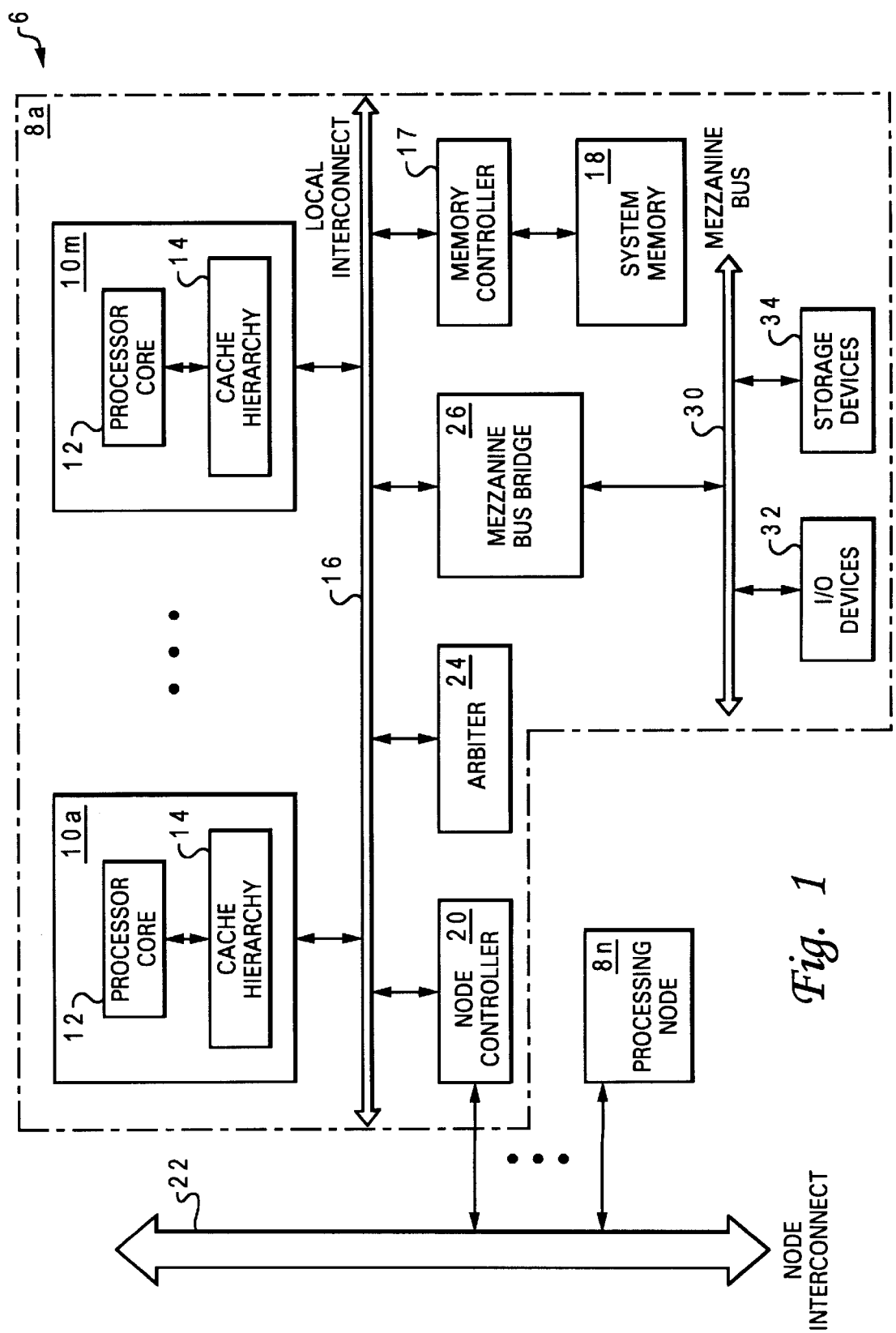
FIG. 1 depicts an illustrative embodiment of a NUMA computer system in accordance with the present invention.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number ($N \geq 2$) of processing nodes 8a–8n, which are interconnected by node interconnect 22. Processing nodes 8a–8n may each include M ($M \geq 0$) processors 10, a local interconnect 16, and a system memory 18 that is accessed via a memory controller 17. Processors 10a–10m are preferably (but not necessarily) identical and may comprise a processor within the PowerPC™ line of processors available from International Business Machines (IBM) Corporation of Armonk, N.Y. In addition to the registers, instruction flow logic and execution units utilized to execute program instructions, which are generally designated as processor core 12, each of processors 10a–10m also includes an on-chip cache hierarchy that is utilized to stage data to the associated processor core 12 from system memories 18. Each cache hierarchy 14 includes at least one level of cache and may include, for example, a level one (L1) cache and a level two (L2) cache having storage capacities of between 8–32 kilobytes (kB) and 1–16 megabytes (MB), respectively. As is conventional, such caches are managed by a cache controller that, among other things, implements a selected cache line replacement scheme and a coherency protocol. In the present disclosure, each processor 10 and its associated cache hierarchy 14 is considered to be a single snooper.

Each of processing nodes 8a–8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions (e.g., read requests) to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16, as discussed further below.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Memory Organization

All of processors 10 in NUMA computer system 6 share a single physical memory space, meaning that each physical address is associated with only a single location in one of system memories 18. Thus, the overall contents of the system memory, which can generally be accessed by any processor 10 in NUMA computer system 6, can be viewed as partitioned between system memories 18. For example, in an illustrative embodiment of the present invention having four processing nodes 8, NUMA computer system may have a 16 gigabyte (GB) physical address space including both a general purpose memory area and a reserved area. The general purpose memory area is divided into 500 MB segments, with each of the four processing nodes 8 being allocated every fourth segment. The reserved area, which may contain approximately 2 GB, includes system control and peripheral memory and I/O areas that are each allocated to a respective one of processing nodes 8.

For purposes of the present discussion, the processing node 8 that stores a particular datum in its system memory 18 is said to be the home node for that datum; conversely, others of processing nodes 8a–8n are said to be remote nodes with respect to the particular datum.

Memory Coherency

Because data stored within each system memory 18 can be requested, accessed, and modified by any processor 10 within NUMA computer system 6, NUMA computer system 6 implements a cache coherence protocol to maintain coherence both between caches in the same processing node and between caches in different processing nodes. Thus, NUMA computer system 6 is properly classified as a CC-NUMA computer system. The specific cache coherence protocol that is implemented is implementation-dependent, but in a preferred embodiment of the present invention comprises a variant of the well-known Modified, Exclusive, Shared, Invalid (MESI) protocol that includes a fifth R (Recent) state, as discussed in detail in the above-referenced co-pending application. Hereafter, it will be assumed that cache hierarchies 14 and arbiters 24 implement the conventional R-MESI protocol, of which node controllers 20 recognize the M, S and I states and consider the E state to be merged into the M state and the R state to be merged into the S state. That is, node controllers 20 assume that data held exclusively by a remote cache has been modified, whether or not the data has actually been modified, and do not distinguish between the S and R states for remotely held data.

Interconnect Architecture

Local interconnects 16 and node interconnect 22 can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 8 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| AParity <0:2> | Indicates parity for address bits <0:63> |
| TDescriptors | Indicate size and type of communication transaction. |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 8, status and coherency responses are communicated between each snooper and the local arbiter 24. The signal lines within local interconnects 16 that are utilized for status and coherency communication are summarized below in Table III.

TABLE III

| Signal Name | Description |
| --- | --- |
| AStatOut | Encoded signals asserted by each bus receiver to indicate flow control or error information to arbiter |
| AStatIn | Encoded signals asserted by arbiter in response to tallying the AStatOut signals asserted by the bus receivers |
| ARespOut | Encoded signals asserted by each bus receiver to indicate coherency information to arbiter |
| ARespIn | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V.

TABLE V

| Coherency responses | Meaning |
| --- | --- |
| Retry | Source of request must retry transaction usually for flow control reasons |
| Modified intervention | Line is modified in cache and will be sourced from cache to requestor |
| Shared intervention | Line is unmodified in cache (and possibly shared) and will be sourced from cache to requestor |
| Shared | Line is held shared in cache |
| Null | Line is invalid in cache |
| ReRun | Snooped request has long latency and source of request will be instructed to reissue transaction at a later time |

The ReRun AResp vote, which is usually issued by a node controller 20, indicates that the snooped request has a long latency (e.g., the request will be serviced by a processor 10 or system memory 18 at a remote processing node 8) and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Node Controller

Figure 2:
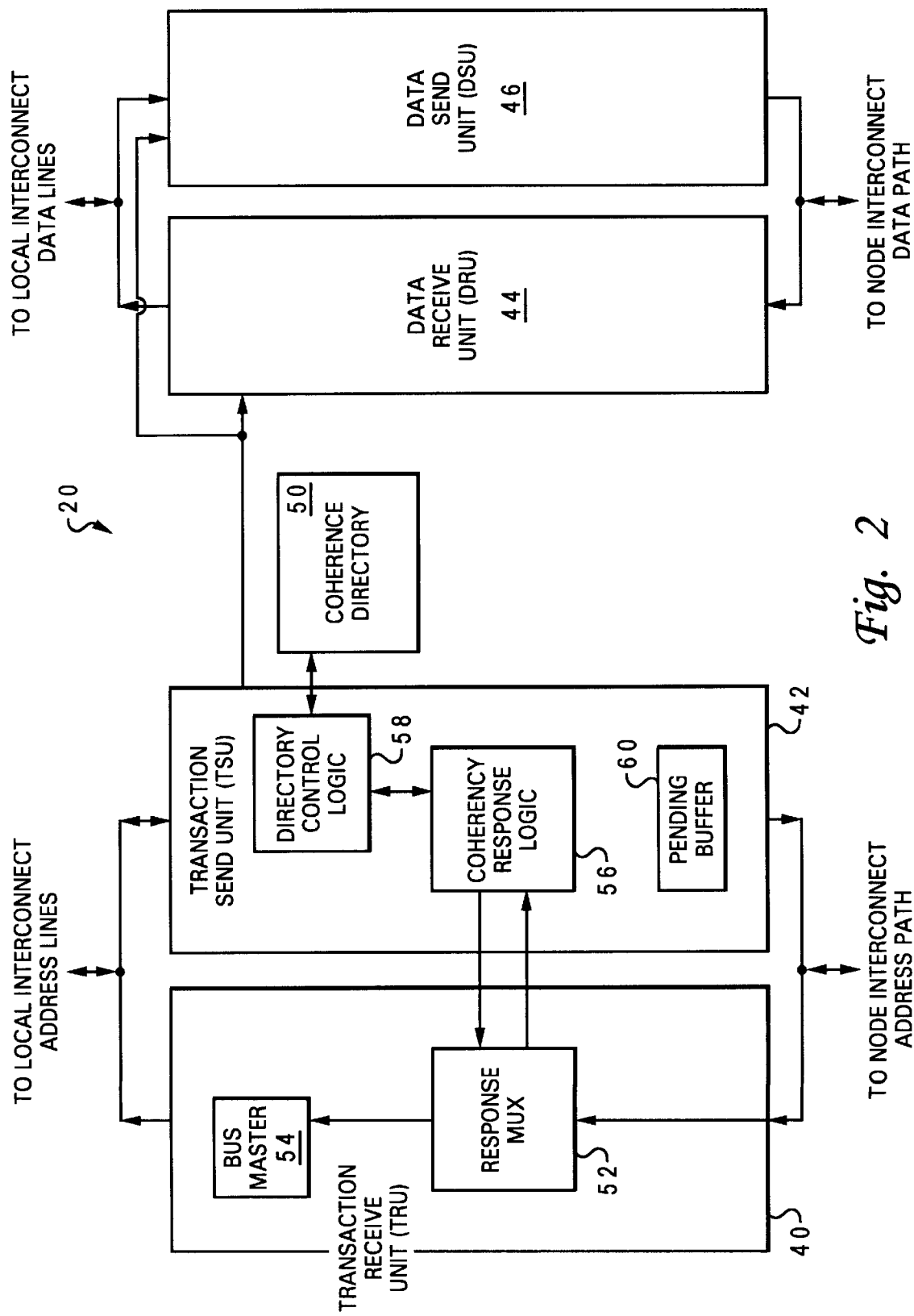
FIG. 2 is a more detailed block diagram of the node controller shown in FIG. 1.

Referring now to FIG. 2, there is illustrated a more detailed block diagram of a node controller 20 in NUMA computer system 6 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address (and coherency) packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the type of communication transaction indicated by the received address packet.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that the pending buffer entry can be deleted, or to ReRun, indicating that the transaction is still pending. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherency directory 50 are summarized in Table VI.

TABLE VI

| Coherence directory state | Possible state(s) in local cache | Possible state(s) in remote cache | Meaning |
|---|---|---|---|
| Modified (M) | I | M,E, or I | Cache line may be modified at a remote node with respect to system memory at home node |
| Shared (S) | R, S or I | R, S or I | Cache line may be held non-exclusively at remote node |
| Invalid (I) | R,M,E,S, or I | I | Cache line is not held by any remote node |
| Pending-shared | R, S or I | R, S or I | Cache line is in the process of being invalidated at remote nodes |
| Pending-modified | I | M,E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from R, S or E to I or from E to M without notifying the node controller 20 of the home node.

Processing read requests

In order to decrease latency of processor read requests, the present invention supports shared intervention, that is, the sourcing of data in response to a read request by a cache holding data in an unmodified (i.e., E or M) state, in NUMA computer system 6. Because multiple caches in NUMA computer system 6 may concurrently hold the same unmodified cache line, some mechanism is required to regulate which cache sources the cache line by shared intervention. As described in the above-referenced co-pending applications, that mechanism is the R (Recent) cache coherency state. In accordance with the present invention, only one cache hierarchy 14 in a particular processing node 8 can hold a particular cache line in the R state at any one time; however, cache hierarchies 14 in multiple processing nodes 8 may concurrently hold the same cache line in the R state.

Table VII summarizes the state transitions at a cache hierarchy 14 that issues a read request on its local interconnect 16 following a read miss.

TABLE VII

| Master state transition | ARespIn vote received | Data source |
|---|---|---|
| I→R | Shared | system memory or node cohtroller |
| I→E | Null | system memory or node controller |
| I→R | Shared intervention | snooper |
| I→R | Modified intervention | snooper |

As indicated, if cache hierarchy 14 receives an ARespIn Shared coherency vote, the cache controller of cache hierarchy 14 "knows" that no other snooper in the same processing node 8 holds the requested cache line in R state or M state and that the requested cache line will be supplied by either the local system memory 18 or a remote system memory 18 via node controller 20. Accordingly, when requesting cache hierarchy 14 receives the requested cache line via local interconnect 16, the cache controller of cache hierarchy 14 caches the requested cache line and sets its coherency state to Recent, meaning that, of the multiple local cache hierarchies 14 holding the requested cache line, the requesting cache hierarchy 14 is responsible for sourcing the requested cache line by Shared intervention.

If the requesting cache hierarchy 14 receives an ARespIn Null coherency vote in response to the read request, the cache controller of the requesting cache hierarchy 14 "knows" that no local cache hierarchy 14 stores a copy of the requested cache line and that the requested cache line will be sourced by either the local system memory 18 or a remote system memory via node controller 20. When the requested cache line is received by requesting cache hierarchy 14, the requested cache line is cached in the Exclusive state.

If the requesting cache hierarchy 14 receives an ARespIn Shared intervention or Modified intervention vote, the cache controller at requesting processor 10 "knows" that the requested cache line will be sourced by another snooper in the same processing node 10, and upon receipt of the requested cache line stores it in the R state.

The state transitions within the cache hierarchy of a snooper in response to receipt of a read request are summarized below in Table VIII. Importantly, the influence of a read request on the coherency state of a cache line depends upon whether the read request was received from a local processor 10 or was received from a processor 10 in a remote processing node 8 via the local node controller 20. The information regarding the source of the read request can be conveyed to snooping processors 10 in a number of ways. For example, node controller 20 can supply a "remote request" signal to the cache hierarchy 14 of each processor 10 that indicates when node controller 20 has sourced a read request from a remote processing node 8 on the local interconnect 16. Such a "remote request" signal can be inserted into a defined (e.g., transaction type) field within the read request transaction on local interconnect 16 by node controller 20 or can be transmitted via a separate signal line connecting node controller 20 to each processor 10.

TABLE VIII

| Snooper state or state transition | Snooper ARespOut vote | Read request source |
|---|---|---|
| I | Null | local processor or node controller |
| E→S | Shared int. | local processor |
| M→S | Modified int. | local processor |
| S | Shared | local processor or node controller |
| R→S | Shared int. | local processor |
| E→R | Shared int. | node controller |
| M→R | Modified int. | node controller |
| R | Shared int. | node controller |

As shown in Table VIII, if a cache hierarchy 14 snoops a read request issued by a local processor 10 (i.e., the "remote request" signal is not asserted) and holds the requested cache line in either Exclusive state or Recent state, the snooping cache hierarchy 14 provides a Shared intervention ARespOut vote, sources the requested cache line on local interconnect 16 in response to receipt of a Shared intervention ARespIn vote from arbiter 24, and updates the coherency state of its copy of the requested cache line to Shared state. Similarly, if a cache hierarchy 14 snoops a read request issued by a local processor 10 and holds the requested cache line in Modified state, the snooping cache hierarchy 14 provides a Modified intervention ARespOut vote, sources the requested cache line on local interconnect 16 in response to receipt of a Modified intervention ARespIn vote, and updates the coherency state of its copy of the requested cache line to Shared state. If, on the other hand, a snooping cache hierarchy 14 holds a cache line requested by a local or remote processor 10 in Shared or Invalid state, the snooping cache hierarchy 14 supplies the appropriate ARespOut vote (i.e., Shared or Null, respectively), but does not source data.

The remaining three cases shown in Table VIII occur when a snooping cache hierarchy 14 at the home or remote node of a cache line receives a read request for the cache line from a remote processing node 8 via the local node controller 20. As noted above, such read requests are identified by a "remote request" signal. In response to receipt of such a read request, the snooping cache hierarchy 14 supplies the appropriate ARespOut vote, namely, Shared intervention if the requested cache line is held in either the Exclusive or Recent state and Modified intervention if the requested cache line is held in the Modified state. Then, in response to receipt of an ARespin Shared intervention signal (if an ARespout Shared intervention vote was given) or ARespIn Modified intervention signal (if an ARespOut Modified intervention vote was given), the snooping cache hierarchy 14 sources the requested cache line on local interconnect 16. In addition, the coherency state of the requested cache line at the snooping cache hierarchy 14 is updated to the Recent state, if in Exclusive or Modified state, and remains unchanged if already set to the Recent state. The cache line sourced on local interconnect 16 by the snooping cache hierarchy 14 is received by the local controller 20, which transmits the cache line to the node controller of the requesting processing node 8 via node interconnect 22.

For those states and operations not shown in Tables VII and VIII, coherency state transitions and coherency responses are performed in accordance with the prior art MESI protocol, with the Recent state being treated like the Shared state.

Figure 3A:
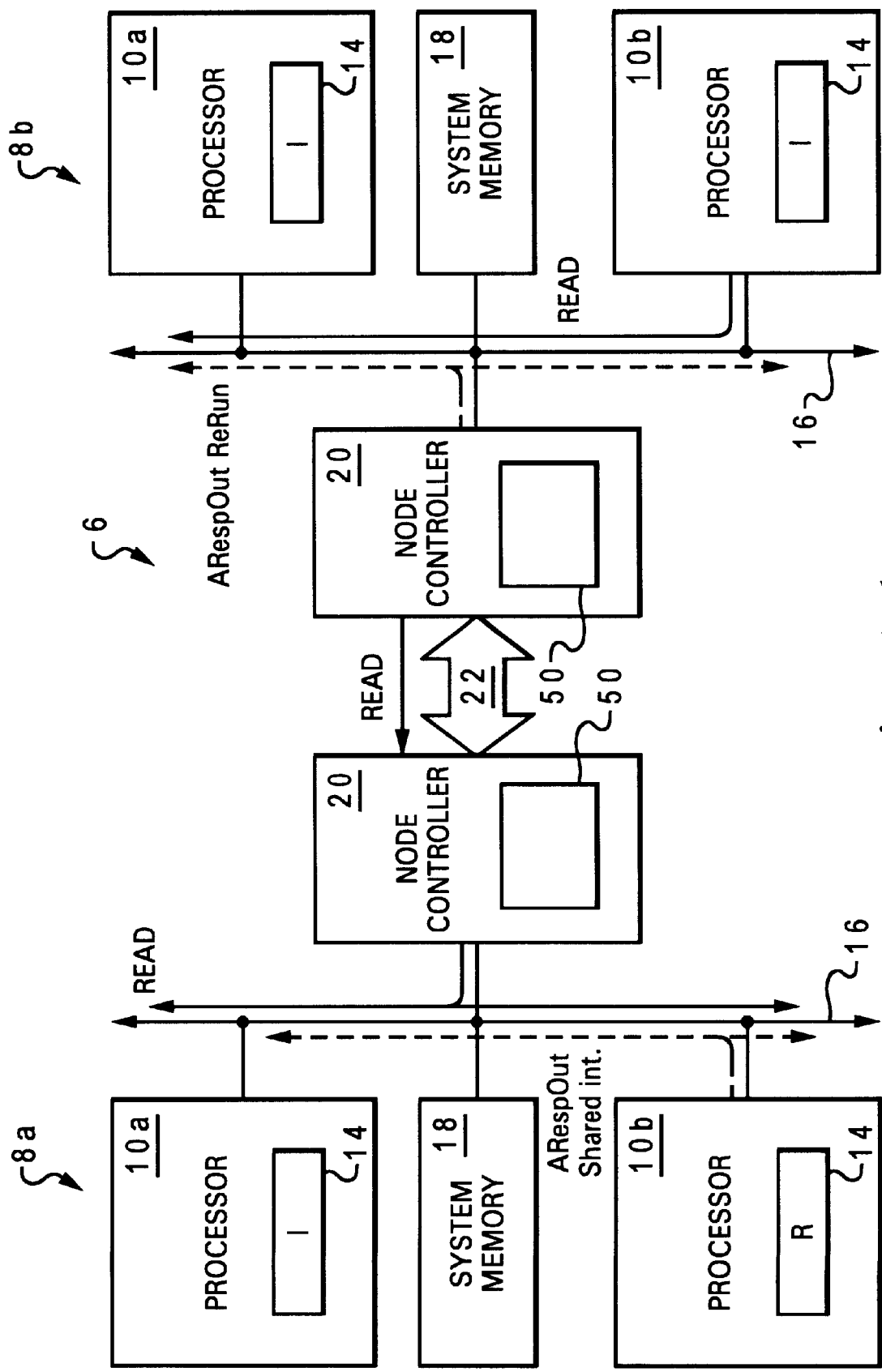
FIGS. 3A and 3B depicts an exemplary processing scenario in a NUMA computer system in which a cache line requested in a read request received from a remote processing node is sourced at a destination processing node by shared intervention.
Figure 3B:
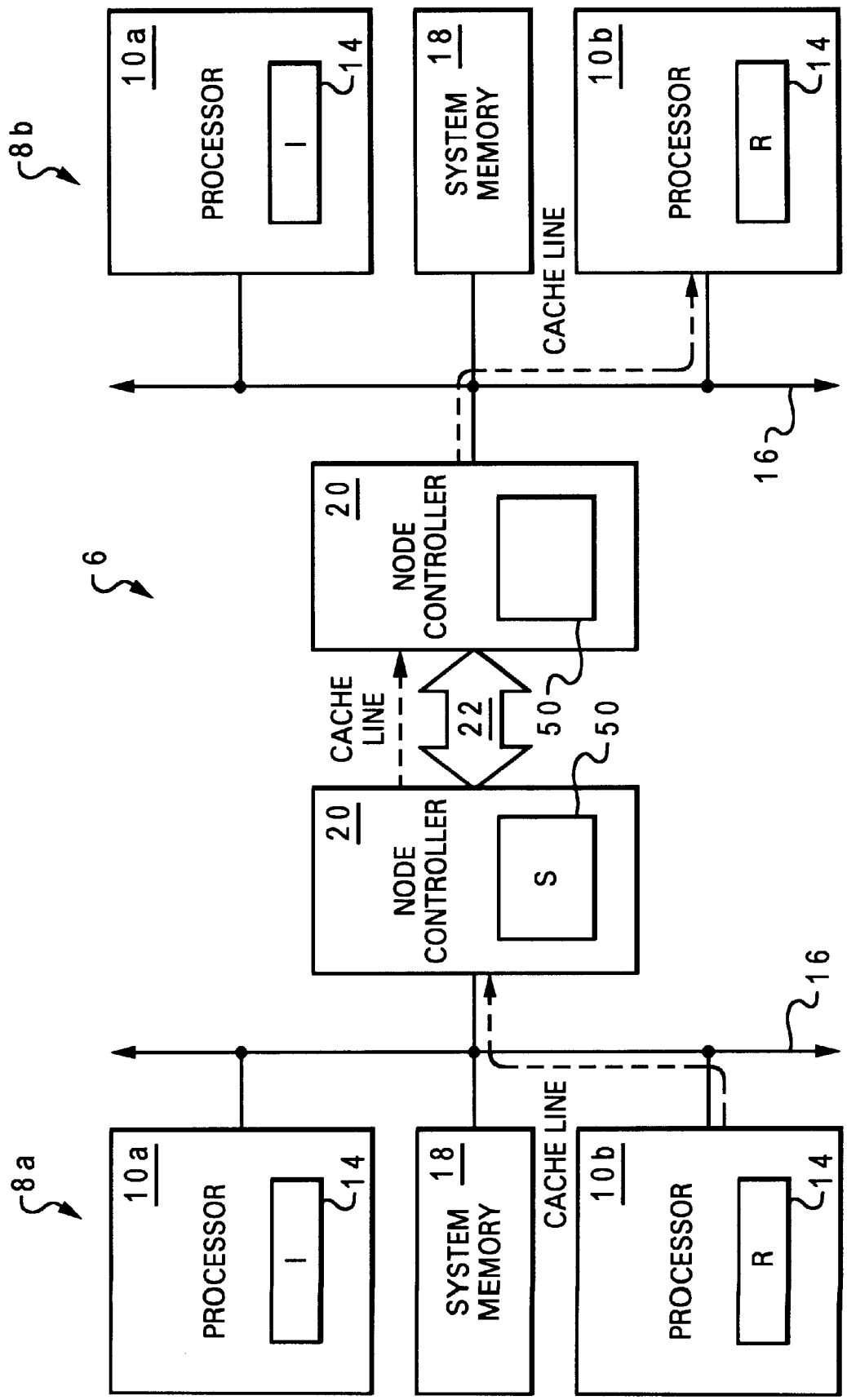

With reference now to FIGS. 3A and 3B, there is depicted an exemplary processing scenario in NUMA computer system 6 in which a cache line requested in a read request received from a remote processing node 8 is sourced at a destination processing node 8 by shared intervention. For clarity, a simplified embodiment of NUMA computer system 6 is illustrated that includes two processing nodes 8a and 8b that each include two processors 10a and 10b.

As shown in FIG. 3A, processor 10b of processing node 8b first requests a cache line from its cache hierarchy 14 that has processing node 8a as the home node. In response to the request missing in cache hierarchy 14, processor 10b sources a read request for the cache line on its local interconnect 16. Processor 10a snoops the read request and responds with a Null ARespOut vote, indicating that cache hierarchy 14 of processor 10a does not store a copy of the requested cache line, and node controller 20 votes ARespOut ReRun. In response to the arbiter (not illustrated) compiling the ARespOut votes and voting ARespIn ReRun, node controller 20 forwards the read request to the home node, i.e., processing node 8a, via node interconnect 22.

In response to receipt of the forwarded read request, node controller 20 of processing node 8a forwards the read request onto local interconnect 16 of processing node 8a in conjunction with a "remote request" signal. Because cache hierarchy 14 of processor 10*b* stores a copy of the requested cache line in the Recent state, processor 10*b* provides an ARespOut Shared intervention vote. Processor 10*b* subsequently sources the requested cache line onto local interconnect 16 by shared intervention in response to receipt of an ARespIn Shared intervention vote from the arbiter, as shown in FIG. 3B. However, because processor 10*b* was notified by node controller 20 that the read request was a "remote request" forwarded from processing node 8*b*, cache hierarchy 14 of processor 10*b* retains the requested cache line in Recent state.

The data transaction containing the requested cache line is received by node controller 20 of processing node 8*a* and forwarded to node controller 20 of processing node 8*b* via node interconnect 22. Coherency directory 50 of processing node 8*a* records that the cache line has been "checked out" to processing node 8*b* non-exclusively by updating the coherency state of the cache line to the imprecise Shared state. The requested cache line is then supplied by node controller 20 of processing node 8*b* to processor 10*b*, which stores the requested cache line in the Recent state. In this manner, processor 10*b* at each of processing nodes 8*a* and 8*b* may subsequently service local and remote requests for the cache line.

As has been described, the present invention provides a NUMA computer system that advantageously reduces the number of inter-node read requests and reduces the latency of read requests by supporting shared intervention of data. According to the present invention, each processing node may have a snooper (e.g., cache hierarchy) that holds the same cache line in a non-exclusive Recent state from which that snooper can source the cache line. To prevent snoopers from updating the coherency state of a cache line held in Recent, Exclusive, or Modified state to Shared state in response to a remote processor's read request, each snooper is notified of such requests by a remote request signal.

While the invention has been particularly shown and described with reference to a preferred embodiment, it will be understood by those skilled in the art that various changes in form and detail may be made therein without departing from the spirit and scope of the invention.

What is claimed is:

1. A computer system, comprising:

first and second processing nodes coupled together, wherein said first processing node includes a system memory and a first processor having a first cache hierarchy and a second processor having a second cache hierarchy, and wherein said second processing node includes at least a system memory and a third processor having a third cache hierarchy;

wherein said first cache hierarchy, responsive to receipt of a read request from the second processing node for a copy of an unmodified cache line held by said first cache hierarchy, sources a copy of said unmodified cache line to said third cache hierarchy and retains said unmodified cache line in a Recent coherency state from which said first cache hierarchy can source said cache line; and wherein said third cache hierarchy, responsive to receipt of said copy of said unmodified cache line, concurrently stores said cache line in said Recent state to permit said third cache hierarchy to also source said cache line.

2. The computer system of claim 1, wherein said first cache hierarchy, responsive to receipt of a request by said third cache hierarchy for a copy of a cache line that said first cache hierarchy holds in modified state, said first cache hierarchy sources a copy of said modified cache line to said third cache hierarchy and retains said cache line in said Recent coherency state.

3. The computer system of claim 1, wherein said first cache hierarchy retains said cache line in said Recent coherency state only in response to receipt of an indication that said read request is from another processing node.

4. The computer system of claim 1, wherein prior to receipt of said read request, said first cache hierarchy associates said unmodified cache line with a coherency state that is one of Exclusive and Recent.

5. The computer system of claim 3, wherein said first and second processing nodes are coupled by a node interconnect and each contain a respective one of first and second node controllers for managing communication over said interconnect, wherein one of said first and second node controllers provides said indication in response to receipt of said read request.

6. A method of data sharing in a computer system including first and second processing nodes coupled together, wherein said first processing node includes a system memory and a first processor having a first cache hierarchy and a second processor having a second cache hierarchy, and wherein said second processing node includes at least a system memory and a third processor having a third cache hierarchy, said method comprising:

at said first cache hierarchy, receiving from said third processor a read request for a cache line; and if said requested cache line is held in said first cache hierarchy in an unmodified state, sourcing a copy of said unmodified cache line from said first cache hierarchy to said third cache hierarchy, retaining said cache line in said first cache hierarchy in a Recent coherency state from which said first cache hierarchy can source said cache line, and concurrently storing said copy of said cache line in said third cache hierarchy in said Recent coherency state to also permit said third cache hierarchy to source said cache line.

7. The method of claim 6, and further comprising:

if said requested cache line is held in said first cache hierarchy in a modified state, sourcing a copy of said cache line from said first cache hierarchy to said third cache hierarchy and retaining said cache line in said first cache hierarchy in said Recent coherency state.

8. The method of claim 6, wherein retaining said cache line in said Recent coherency state comprises retaining said cache line in said Recent coherency state only in response to receipt of an indication that said read request is from another processing node.

9. The method of claim 6, and further comprising:

prior to receipt of said read request, associating said unmodified cache line with a coherency state that is one of Exclusive and Recent in said first cache hierarchy.

10. The method of claim 9, wherein said first and second processing nodes are coupled by a node interconnect and each contain a respective one of first and second node controllers for managing communication over said interconnect, said method further comprising generating said indication at one of said first and second node controllers in response to receipt of said read request.

* * * * *